Sept. 11, 1962  J. N. STAFFORD  3,053,493
LINKING AND NESTING UNITS
Filed May 5, 1960  9 Sheets-Sheet 1
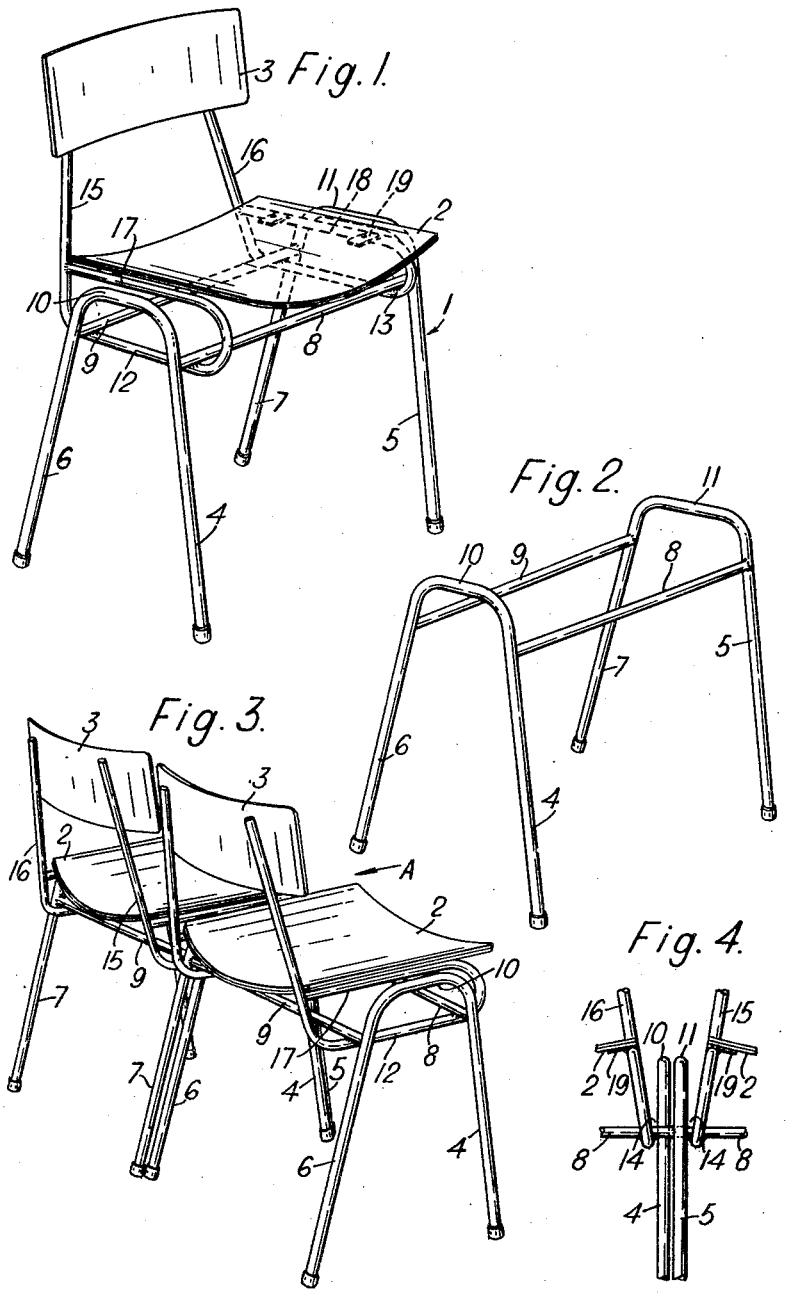
Inventor
John Neville Stafford
By Jucker Jucke
Attorney Sept. 11, 1962    J. N. STAFFORD    3,053,493
LINKING AND NESTING UNITS
Filed May 5, 1960    9 Sheets-Sheet 2

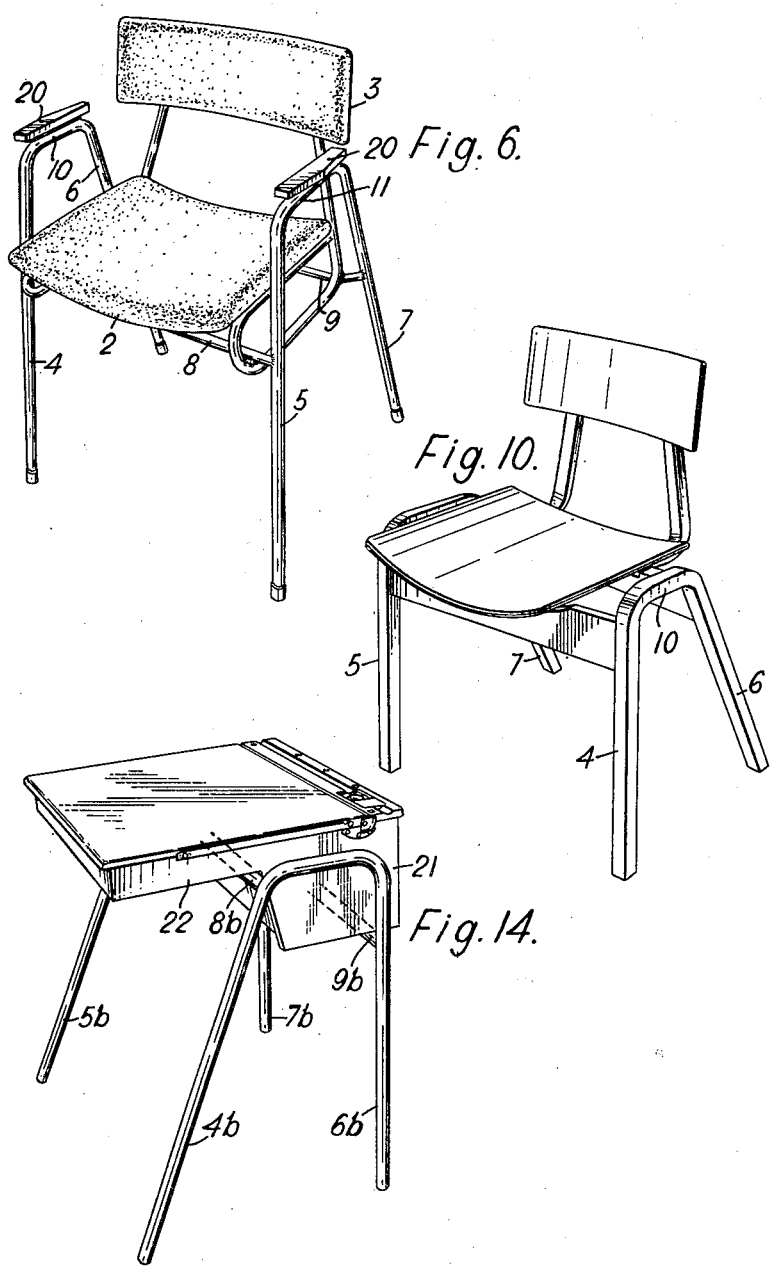

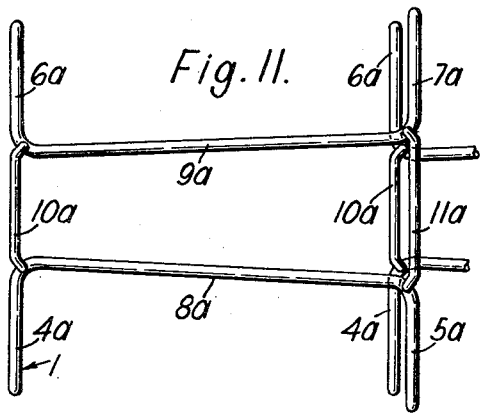
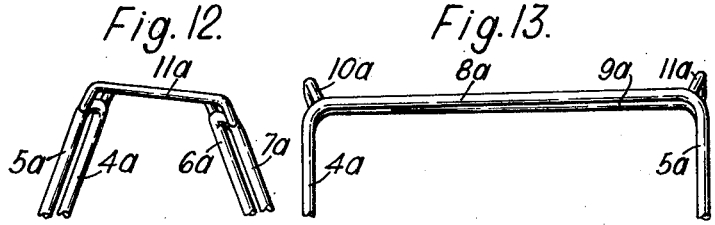
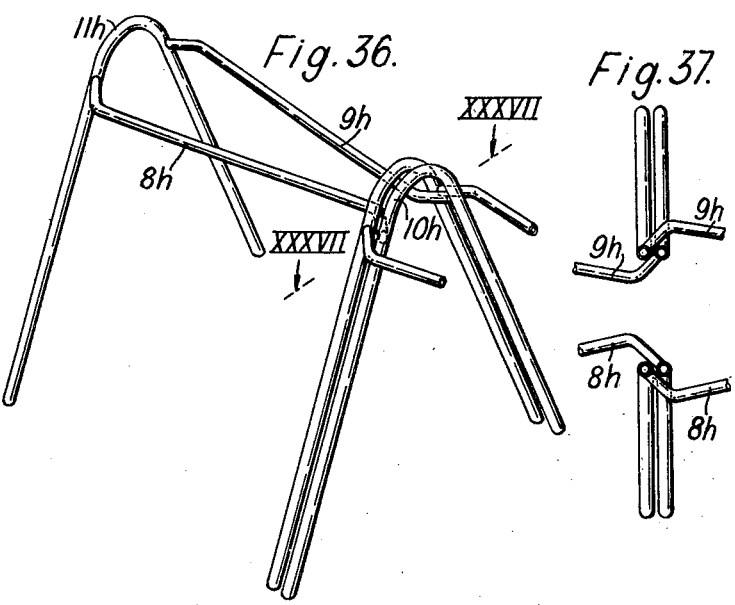

Sept. 11, 1962     J. N. STAFFORD     3,053,493
LINKING AND NESTING UNITS
Filed May 5, 1960                                    9 Sheets-Sheet 7

Inventor
John Neville Stafford
By Lucke & Lucke
Attorney

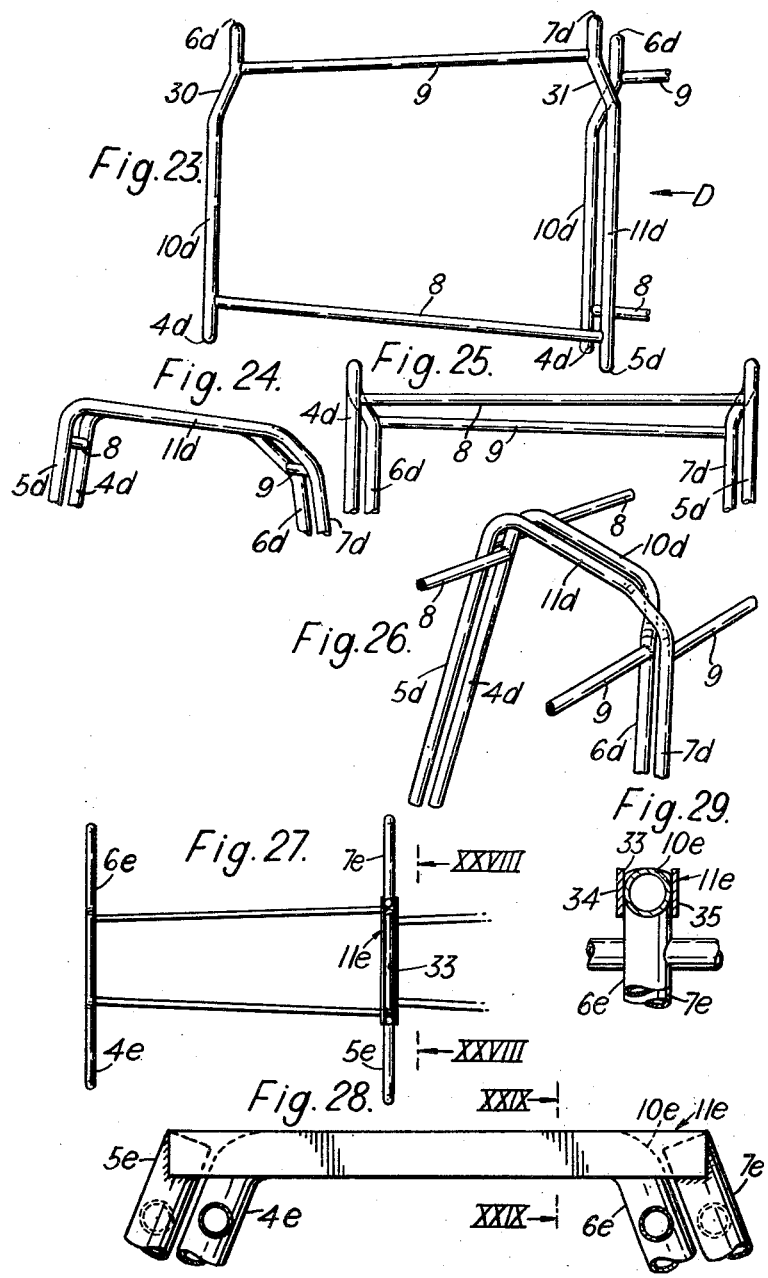

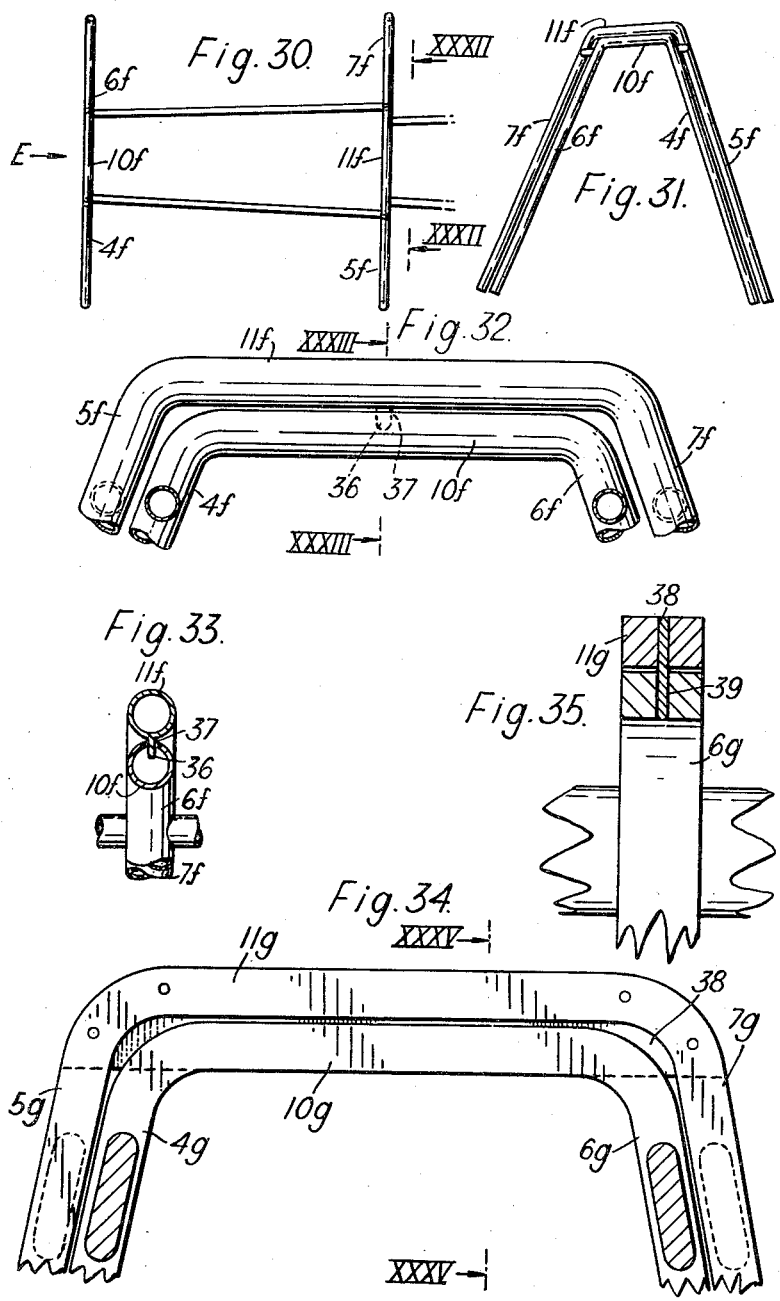

United States Patent Office 3,053,493
Patented Sept. 11, 1962

3,053,493
LINKING AND NESTING UNITS
John Neville Stafford, 6 Justice Walk,
London SW. 3, England
Filed May 5, 1960, Ser. No. 27,053
Claims priority, application Great Britain May 7, 1959
18 Claims. (Cl. 248—163)

This invention concerns improvements in or relating to nesting or stacking chairs, seats, bench seats, benches, tables, desks and like units (all hereinafter generally and inclusively referred to as "nesting units").

An object of this invention is to provide nesting units which can not only be stacked vertically one upon the other but which are capable of being linked together end-to-end in a row, the units being of simple construction without any complicated linking mechanism such as springs, catches, hooks, or the like that are liable to catch and tear the clothes of a user.

According to this invention there is provided, for a nesting unit linkable end-to-end with another such unit, an underframe comprising two end pairs of mutually spaced front and rear legs, said pairs of legs being rigidly connected in spaced relationship by connecting means extending between them in the longitudinal direction of the underframe, the front and rear legs of each said pair being rigidly spaced apart in a back-to-front direction and one end of said underframe being formed so as to be capable of engagement over the other end of a like underframe arranged end-to-end with the first named underframe, at least one of the legs of the pair at such one end of the underframe having means extending transversely and inwardly of the upper part thereof and adapted, when such one end of the underframe is engaged over the other end of the said like underframe as aforesaid, to interlock with co-operating means provided at the upper part of at least one of the legs of the adjoining pair of legs at such other end of the said like underframe, thereby to link the end-to-end underframes against endwise separation in the direction of the length of the row of underframes formed by interlocking two or more such underframes together end-to-end.

The term "longitudinal direction" used herein means in the direction of the width of the underframe between the two end pairs of legs thereof.

Further aspects and features of this invention will become apparent from the following description and claims. In order that the nature of the invention may be more readily understood certain embodiments of the same will now be described by way of example with reference to the accompanying drawings in which:

FIGURE 1 is a perspective view of a nesting and stacking chair constructed in accordance with this invention;

FIGURE 2 is a perspective view of the underframe of the chair shown in FIGURE 1;

FIGURE 3 is a perspective view taken from the rear and one end of two chairs as shown in FIGURE 1 linked end-to-end;

FIGURE 4 is a fragmentary view looking in the direction of arrow A FIGURE 3 showing how the underframes link together;

FIGURE 6 illustrates a modification of the chair shown in FIGURE 1;

FIGURE 10 is a perspective view of a chair constructed in accordance with this invention and similar to that shown in FIGURE 8 but formed primarily of wood instead of metal as is the chair shown in FIGURE 8;

FIGURE 11 is a plan view of a modified form of the underframe shown in FIGURE 2 and part of a second underframe linked thereto, the two underframes being shown slightly separated in an endwise direction for the sake of clarity;

FIGURE 12 is a fragmentary end view of the underframe shown in FIGURE 11;

FIGURE 13 is a fragmentary front elevation of the complete underframe shown in plan in FIGURE 11;

FIGURE 14 illustrates the invention applied to a school desk;

FIGURE 23 is a plan view of a modified form of underframe constructed in accordance with this invention linked end-to-end with another identical underframe, only a fraction of the latter being shown;

FIGURE 24 is a fragmentary end view of the underframe shown in FIGURE 23 as seen in the direction of arrow D;

FIGURE 25 is a fragmentary front elevation of the complete underframe shown in FIGURE 23;

FIGURE 26 is a diagrammatic perspective view of the linked end frames of two of the underframes shown in FIGURES 23 to 25;

FIGURE 27 is a plan view of a still further modified form of the underframe shown in FIGURE 2, shown linked with a second identical frame, only one end portion of which is illustrated;

FIGURE 28 is a section on line XXVIII—XXVIII, FIGURE 27, drawn to an enlarged scale;

FIGURE 29 is a section on line XXIX—XXIX, FIGURE 28;

FIGURE 30 is a plan view of a still further modified form of the underframe shown in FIGURE 2;

FIGURE 31 is an end view looking in the direction of arrow E, FIGURE 30, of the end frame shown in that figure;

FIGURE 32 is a section on line XXXII—XXXII, FIGURE 30, drawn to an enlarged scale;

FIGURE 33 is a section on line XXXIII—XXXIII, FIGURE 32;

FIGURE 34 shows a modified form of the underframe illustrated in FIGURES 30 to 33, the figure illustrating the adjacent end frames of two adjoining underframes linked together, the view being similar to FIGURE 32;

FIGURE 35 is a section on line XXXV—XXXV, FIGURE 34;

FIGURE 36 is a perspective view of a still further modified form of the underframe shown in FIGURE 2, the figure illustrating the end-to-end linking of the underframe with another identical underframe, a fraction only of which is illustrated; and FIGURE 37 is a sectional plan on line XXXVII—XXXVII, FIGURE 36.

Figure 5:
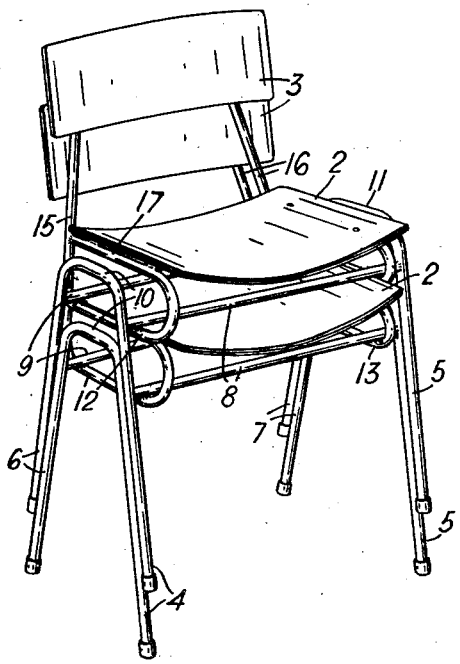
FIGURE 5 shows the two chairs illustrated in FIGURE 3 nested or stacked with one vertically straddling the other.

It will be seen that the vertically nesting or stacking and linking unit constituting the first embodiment of the invention exemplified in the accompanying drawings and shown in FIGURES 1 to 5, is in the form of a chair comprising an underframe generally indicated by the reference 1 carrying a seat panel 2 and a seat back 3 which, in the example shown, are both formed by concave sheets of resin bonded, or other suitable, plywood but which may be made of any other appropriate material such as metal, synthetic resin bonded glass fibre or the like, and may be upholstered or not as desired.

The underframe 1 comprises four legs, namely, two front legs 4 and 5 and two rear legs 6 and 7, these legs being arranged in two pairs, one pair 4 and 6 and the other 5 and 7 and both pairs being arranged in vertical planes with one pair at each end portion of the underframe. One of the end portions is asymmetrically disposed about a transverse central plane through the underframe relative to the other end portion. This construction produces an underframe having one wider asymmetrical end portion and a narrower symmetrical end portion.

The two front legs 4, 5 are rigidly connected together towards their upper parts by a longitudinal connecting member 8 extending substantially horizontally between them whilst the rear legs 6 and 7 are rigidly connected together towards their upper ends by a longitudinal connecting member 9.

The legs 4 and 6 diverge downwardly with respect to one another as do the legs 5 and 7 which are, however, somewhat more widely spaced than the legs 4 and 6 so that, if these two end pairs of legs 4 and 6 and 5 and 7 were arranged in the same plane one pair over the other pair, the pair 4, 6 would fit or nest within the pair 5, 7 with the front legs of the two pairs substantially parallel and the rear legs of the two pairs also substantially parallel.

Above the connecting members 8, 9 the upper end portions of the legs of each of the two pairs of legs 4, 6 and 5, 7 are furnished with a transversely extending element, these elements being respectively marked 10 and 11 and which are, in the embodiment shown, formed integrally with the front and rear legs of their respective pairs and are located wholly in the same front to rear plane as these legs. The connecting members 8 and 9 being straight and substantially horizontal, and the legs 5 and 7 being more widely spaced at the positions of attachment of the members 8 and 9 thereto than are the legs 4 and 6 at the positions at which the connecting members 8 and 9 are attached thereto, it will be apparent that the members 8 and 9 converge, as seen in plan, from the more widely spaced end pairs of legs 5, 7 to the other end pair of legs 4, 6.

In the embodiment being described, the underframe 1 is formed of tubular metal, the end pairs of legs 4, 6 and their transverse element 10 and the end pair of legs 5, 7 and their transverse element 11 each being conveniently formed from a single length of tube bent to form an open bottomed arched or stirrup-like or inverted truncated V-shaped end frame, the transverse part of this end frame constituting the transverse element 10 or 11 and the downwardly extending parts of the end frame constituting the mutually downwardly continuously divergent legs 4, 6 or 5, 7. The transverse elements 10 and 11 could be formed separately of the associated legs and be welded or otherwise fixed to the upper ends thereof.

The connecting members 8 and 9 are also conveniently formed of rectilinear lengths of metal tube welded at their ends to the upper parts of the adjoining legs 4, 5 or 6, 7 at some distance below the upper parts of the transverse elements 10 and 11.

It will be understood that a series of the said underframes 1 (or units of which said underframes form part) may, as shown in FIGURE 5, be stacked vertically one upon the other with the end pairs of legs 4, 6 and 5, 7 of successive end frames down the stack nesting within and in the same plane as, the corresponding legs of the immediately superposed underframe.

Two or more underframes 1 may also be linked together end-to-end to form a row by simply arranging the underframes substantially end-to-end with one another with the more narrowly spaced end pair of legs 4, 6 of one underframe next to the more widely spaced end pair of legs 5, 7 of an adjacent underframe, raising the latter underframe a few inches, moving it endwise into overlapping relationship with the first mentioned underframe so that the inner surfaces of the more widely spaced legs 5 and 7 of the second named underframe and of the transverse element 11 associated with these legs lie closely behind the corresponding inner surfaces of the more narrowly spaced legs 4 and 6 and the transverse element 10 of these legs of the first mentioned underframe, and then lowering the second named underframe onto the first named underframe until all the feet of all the legs of the two underframes are resting on the ground in the same plane and the transverse element 11 of the second named underframe is engaged immediately behind the cooperating transverse element 10 of the first named underframe, as shown in FIGURE 4. At least parts of the legs 5, 7 may also engage behind corresponding parts of the adjoining legs 4, 6.

When the two underframes have been interlinked together with the transverse element 10 in register with and behind the transverse element 11 as above described, the more narrowly spaced end portions of the connecting members 8 and 9 of the first named underframe are engaged or embraced externally by the upper parts of the legs 5 and 7 of the second named underframe so that not only are the underframes linked together against longitudinal separation but they are additionally locked against any substantial movement transversely of the row of interlinked underframes. It will also be appreciated that by making the connecting members 8 and 9 converge as described, it is ensured that these members do not impede the interlinking of the underframes or prevent the feet of all legs of interlinked underframes resting on the ground.

In describing the parts, e.g. the transverse elements 10 and 11 of end-to-end underframes, as being engaged one behind the other, the underframes are being viewed from an end thereof or from an end of a row of such underframes. The term "inner surfaces" of the legs and transverse elements used herein is intended to refer to those surfaces of a pair of legs and associated transverse element at one end of any underframe that are nearest to the legs and associated transverse element at the opposite end of the same underframe.

It is, of course, desirable that the interlocked underframes should not be capable of telescoping together endwise and means are provided in units constructed according to this invention to prevent this happening. Such means may take alternative forms as will hereinafter become apparent but in the embodiment of the invention being described the restraint against endwise telescoping of the interlinked end-to-end underframes is provided by means of cross bars 12 and 13 rigidly fixed across the connecting members 8 and 9, one adjacent to, but spaced somewhat from, the front and rear legs 4 and 6 and the other adjacent to, but somewhat spaced from, the legs 5 and 7 of the underframe, the distance between the cross bars 12 and 13 and the nearest pair of legs being such as to provide a gap 14 adapted comfortably to receive the transverse element 10 or 11 and the upper parts of the associated legs of an interlinked underframe.

In this embodiment of the invention, the cross bars 12 and 13 each curve upwardly at their rear ends to provide upwardly and slightly inwardly directed convergent stays 15 and 16 to the upper parts of which is riveted or otherwise suitably secured the seat back 3.

The front ends of the cross bars 12 and 13 project forwardly somewhat from the front connecting member 8 and then curve upwardly and, at a level somewhat above the transverse elements 10 and 11 of the end pairs of legs 4, 6 and 5, 7, curve rearwardly and then extend horizontally rearwardly to form parallel seat supports 17, 18 which are respectively joined to the upstanding stays 15 and 16, the seat panel supports 17, 18 being furnished with lugs 19 to which the seat panel 2 is secured.

The longitudinal spacing between the seat supports 17 and 18 is rather less than the longitudinal spacing of the cross bars 12 and 13 so that the planes of the two trombone-like structures respectively formed by the members 12, 17 and 13, 18 are arranged in planes which are slightly upwardly convergent as seen from the front of the unit. Moreover, the overall length of the seat panel 2 from end-to-end is slightly less than the distance between the opposed surfaces of the cross bars 12 and 13 so that, when the chairs are stacked one upon the other (as seen in FIGURE 5), the cross bars 12, 13 of a superposed chair embrace between them the seat panel 2 of the chair immediately below and thus lock the chairs in their vertically stacked positions and against endwise movement relative to one another, that is movement in the general direction of the connecting members 8 and 9 or the said longitudinal direction. When the chairs are stacked in this way the connecting members 8 and 9 of succeeding chairs up the stack rest upon the ends of the seat panels 2 of the immediately preceding chair so that the chairs are supported in stacked relation with the end pairs of legs of successive chairs up the stack at both ends of the chairs nesting closely, but not wedging, within one another as clearly seen from FIGURE 5.

When the above described chairs are linked end-to-end, the proximate ends of the seat panels of adjoining chairs are spaced apart.

The embodiment of the invention shown in FIGURE 6 is very similar to that shown in FIGURES 1 to 5 and differs primarily in that the chair is provided with arm rests, this being effected by extending the front and rear legs 4, 6 and 5, 7 upwardly beyond the connecting members 8 and 9 to a greater extent than is the case in the construction shown in FIGURES 1 to 5 so that the transverse elements 10 and 11 are well above the ends of the seat panel 2, the transverse elements 10 and 11 being, in this instance, provided with wooden or other appropriate arm rests 20 which may or may not be upholstered. In this embodiment of the invention the seat panel 2 and the seat back 3 are shown as being upholstered.

Figure 7:
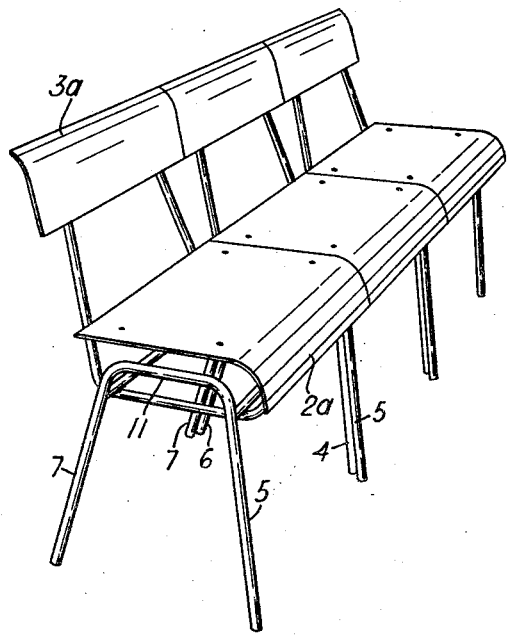
FIGURE 7 is a perspective view taken from one end of a row of three chairs constructed in accordance with this invention linked end-to-end, the seat panels of the chairs being modified as compared with the seat panel shown in FIGURE 1.

FIGURE 7 illustrates a slight modification of the embodiments of the invention above described and wherein the seat panels 2a and the seat backs 3a are rather longer than the corresponding parts 2 and 3 above described, the arrangement being such that, when the chairs are linked end-to-end, the seat panels 2a and seat backs 4a of succeeding chairs in the row abut end-to-end. To ensure this effect being obtained, the seat panel 2a and seat back 3a of each chair are of a length substantially equal to the perpendicular distance between the inner surfaces of the transverse elements 10 and 11 of the end pairs of legs 4, 6 and 5, 7 of the underframe, the ends of the seat panel being spaced above the transverse elements 10 and 11 of the underframe by a distance sufficient to enable a transverse element 11 of one underframe to be passed over the transverse element 10 of the underframe of an adjoining end-to-end underframe and below the corresponding end of the seat panel 2a for interlocking the two chairs together.

In the example of the invention shown in FIGURE 7 the seat panels 2a are for the main part uniplanar but curve downwardly at their front portions around the front ends of the trombone structures hereinbefore referred to.

Figure 8:
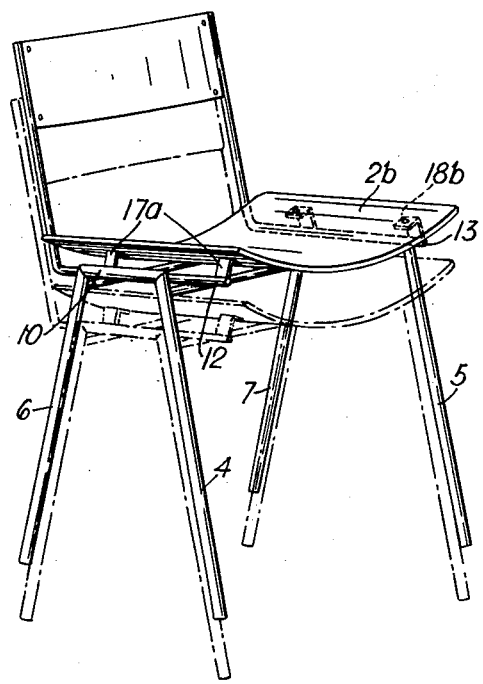
FIGURE 8 is a perspective view of a modification of the chair illustrated in FIGURE 1 and illustrates in dot-and-pick lines this chair nested upon an identical chair.
Figure 9:
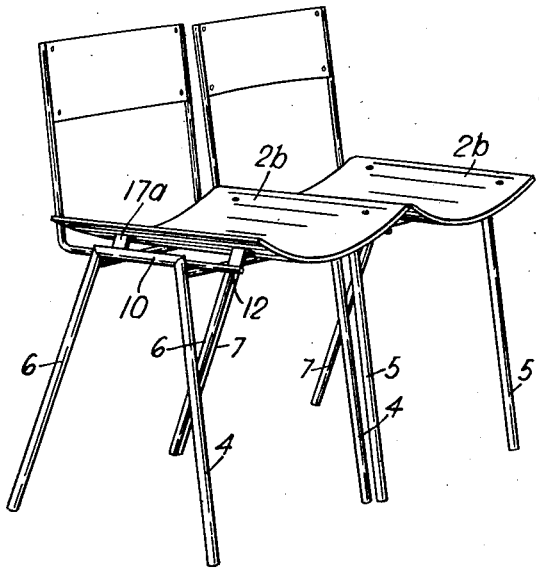
FIGURE 9 is a perspective view of two chairs as shown in FIGURE 8 linked end-to-end.

The chair shown in the modified embodiment of the invention illustrated in FIGURES 8 and 9 is very similar to that illustrated in FIGURES 1 to 5 with the exception that the seat panel is affixed to lugs 17a and 18a directly carried by the cross bars 12 and 13 which do not, in this instance, extend forwardly and upwardly and then rearwardly in trombone fashion, whilst the ends of the seat panels 2b of the interlinked chairs are adapted to abut one another as described in connection with the seat panels 2a of the embodiment of FIGURE 7, the ends of the seat panels 2b being spaced upwardly of the transverse elements 11 and 12 sufficiently to permit interlinking of the chairs end-to-end.

FIGURE 10 illustrates this invention applied to a chair similar to that shown in FIGURES 8 and 9 but in which the chair is formed wholly or mainly of non-metallic material such as wood and particularly synthetic resin bonded or impregnated laminated wood, there being, however, no functional difference between this chair and that shown in the said figures and the only differences residing in those consequent upon the use of different constructional material, i.e. laminated wood instead of metal tube.

FIGURES 11 to 13 show a modification of the underframe 1 described in detail in connection with FIGURES 1 to 5, in which the transverse elements (here designated 10a and 11a) are formed respectively integrally with the front and rear legs 4a, 6a and 5a, 7a; the connecting members 8a and 9a are formed integrally respectively with the legs 4a and 5a and 6a and 7a and thus form two inverted wide U-shaped frames extending longitudinally of the underframe and which are rigidly spaced apart by the transverse elements 10a and 11a which are fixed rigidly at their ends to the connecting members 8a and 9a adjacent the junction of these connecting members with the upper ends of the legs of the underframe.

As will be seen from FIGURE 11 when underframes of this construction are linked together end-to-end the co-operating transverse elements of succeeding underframes engage one behind the other, and it will be appreciated that, if desired, the arrangement could be such that the front and rear legs respectively associated with the two transverse elements 10a and 11a could be arranged to lie in the same vertical plane, i.e., one set within the other, when the underframes are interlocked instead of the legs 4a and 6a lying behind the legs 5a and 7a as shown.

It will be appreciated that an underframe according to this invention and constructed as in any of the ways herein described, for example as described with particular reference to FIGURES 1 to 5, may be used in a variety of different forms of stacking or nesting units which are capable of being interlinked end-to-end. Thus FIGURE 14 shows an underframe as described with reference to FIGURES 1 to 5 (with slight modifications described immediately below), applied to interlinking and nesting or stacking school desks. The construction of the underframe in this embodiment of the invention is substantially the same as that already described except that in order to accommodate the depth of the well 21 of the body 22 of the desk, the rear connecting member 9b of the underframe is arranged at a lower level than the front connecting member 8b. Moreover, in the example illustrated, the rear legs 6b and 7b are arranged vertically instead of being downwardly and rearwardly inclined so as to be symmetrically divergent with respect to the front legs 4b and 5b. It will also be noted that in this construction, the more widely spaced legs 4b, 6b are disposed at the left-hand end of the underframe (viewing the same from the front) instead of in the reverse order as illustrated in the construction shown in FIGURES 1 to 5, but it will be appreciated that so long as all the units that are to be interlinked are correspondingly constructed, it is in all embodiments immaterial at which end of the underframe the wider legs are arranged.

Figure 15:
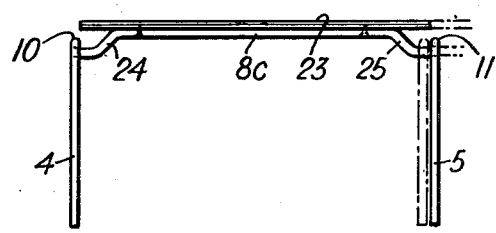
FIGURE 15 is a front elevation of a nesting and linking table constructed in accordance with this invention, the figure indicating in dot-and-pick lines the method of linking two such units end-to-end.
Figure 16:
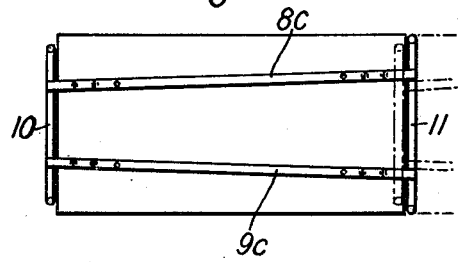
FIGURE 16 is an underneath plan of the table shown in FIGURE 15.

Another application of an underframe constructed in accordance with this invention is illustrated in FIGURES 15 and 16 which illustrate a table. In this construction the underframe is substantially the same as that described with reference to FIGURES 1 to 5 but in order to raise the table top 23 above the level of the transverse elements 10 and 11 to permit interlocking of the units in end-to-end relationship, the connecting members 8c and 9c are each upwardly similarly joggled at 24 and 25 at a short distance from their ends. The ends of the table top are located above and in register with the inner surfaces of the transverse elements 10 and 11 so that when the tables are linked together end-to-end, the ends of the table tops abut one another.

Figure 17:
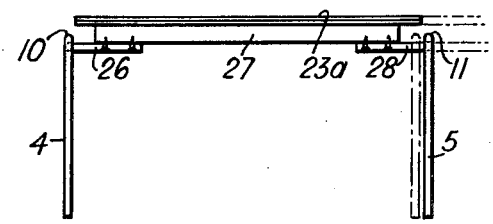
FIGURE 17 illustrates a modified form of table constructed in accordance with this invention.
Figure 18:
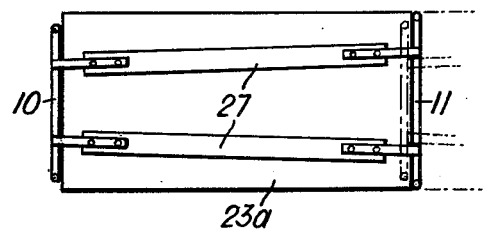
FIGURE 18 is an underneath plan of the table shown in FIGURE 17.
Figure 19:
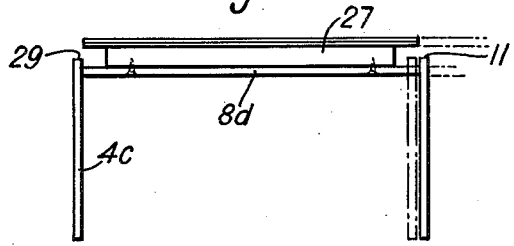
FIGURE 19 is a front elevation of a further nesting and linking table constructed in accordance with this invention, the figure indicating in dot-and-pick lines the method of linking two such units end-to-end.
Figure 20:
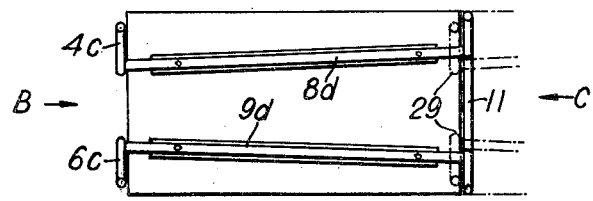
FIGURE 20 is an underneath plan of the table shown in FIGURE 19.
Figure 21:
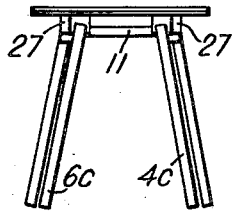
FIGURE 21 is an end elevation of the table shown in FIGURES 19 and 20 viewing the same in the direction of arrow B.
Figure 22:
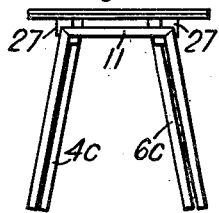
FIGURE 22 is an end elevation of the table shown in FIGURES 19, 20 and 21 viewing the same in the direction of arrow C.

FIGURES 17 and 18 show a modification of the table illustrated in FIGURES 15 and 16, this modification consisting in making the convergent connecting members 8 and 9 of the underframe described with reference to FIGURES 1 to 5 of a composite nature, each of these connecting members being formed in three parts 26, 27 and 28, the parts 26 and 28 being in the form of longitudinally disposed stubs projecting perpendicularly inwardly from the front and rear legs 4, 5 and 6, 7, to which they are rigidly fixed, whilst the parts 27 constitute a pair of convergent battens secured to the underside of the table top 23a, these battens not only serving to connect the end pairs of legs 4, 6 and 5, 7 rigidly together but also to provide the desired spacing of the table top 23a above the transverse elements 10 and 11 of the two end pairs of legs without the need to joggle the stubs 26 and 28.

The embodiment of the invention shown in FIGURES 19 to 22 differs from that shown in FIGURES 17 and 18 only in that the connecting members 8d and 9d, like the members 8 and 9 in the FIGURES 1 to 5 construction, extend entirely from one end pair of legs to the other end pair of the underframe, the battens 27 being screwed to the upper sides thereof, and the transverse element 10 being omitted from the upper ends of the pair of legs 4c, 6c so that the upper end portions 29 of these legs project above the ends of the connecting members 8d and 9d joined thereto and form the necessary abutment for engagement behind the transverse element 11 of a similar underframe interlinked therewith.

In the embodiments of the invention illustrated in FIGURES 16 to 22, and in FIGURES 7 to 9, the telescoping together of adjacent units in a row is prevented by the abutment of the adjacent ends of the table tops or of the seat panels of the chairs as the case may be.

An embodiment of the invention in the form of a chair is illustrated in FIGURES 23 to 26, in which the chair is very similar to that shown in FIGURES 7 and 9, with the exception that instead of the end frames composed of the two end pairs of legs of the underframe and their transverse elements being uniplanar (as in all the other embodiments described) they are of joggled form in plan so that when two underframes are interlinked end-to-end, one set of legs, e.g. the rear legs, are respectively located on the opposite sides of the medial plane between the two interlinked end frames to the other pair of corresponding, e.g. front, legs. Thus, referring to the drawings, it will be seen that the underframe comprises two end pairs of legs, namely, the pair 4d, 6d and the pair 5d, 7d, the rear legs 6d and 7d being set inwardly longitudinally of the underframe with respect to the front legs 4d and 5d that is to say the spacing between the rear legs 6d and 7d is less than that between the front legs 4d and 5d and the transverse elements 10d and 11d are joggled in their lengths as indicated at 30, 31 so that the forward parts of these transverse elements are parallel to one another, then converge towards one another and finally terminate in rearward portions extending parallel to one another. When two underframes of this kind are interlocked end-to-end the forward portion of the transverse element 10d of one of the underframes engages behind the forward portion of the transverse element 11d of the other linked underframe. In addition the oblique joggled parts 30 and 31 of the transverse elements 10d and 11d engage one another and this engagement together with the engagement of the front legs 5d of one underframe with the connecting member 8 of the underframe linked therewith, prevents substantial relative movement of the underframes transversely of the length of the row of linked underframes. This modified form of underframe may be used, as may any of those already described and subsequently described, for tables, desks, bench seats, benches and the like and the arrangement of the connecting members 8, 9 and the means for supporting the seat panel, table top or other supporting surface may be any of those previously described.

A still further modification of the underframe according to the invention is shown in FIGURES 27 to 29 of the drawings from which it will be seen that when the underframes are linked end-to-end the linking end pairs of legs of successive frames are located in a common plane, the interlinking being provided in this construction by forming the wider pair of legs 5e and 7e with parallel flanges or a channel 33, here shown disposed on the transverse element 11e along its underside to receive the transverse element 10e of the interlinking pair of legs 4e and 6e of the next underframe. In the embodiment of the invention illustrated the transverse element 11e is formed by a pair of rigid flat bars 34 and 35 welded at their ends to the upper ends of the front and rear legs 5e and 7e and adapted to straddle and receive between them the transverse element 10e of the other pair of legs 4e, 6e of a similar underframe and with the two pairs of legs 4e, 6e and 5e, 7e in the same vertical plane. In other respects the underframe is similar to that described with reference to FIGURES 1 to 5.

A modification of the arrangement illustrated in FIGURES 27 to 29 is shown in FIGURES 30 to 33 wherein instead of the transverse element 11e of the pair of legs 5e and 7e being of chanel form and fitting over the transverse element 10e of the pair of legs 4e, 6e, the transverse element 11f has at least one dependent tongue or pin 36 adapted, when the end frame composed of the legs 5f, 7f and the transverse element 11f of one underframe is engaged over the end frame composed of the adjacent pair of end legs 4f and 6f and transverse element 10f of the next underframe, to engage in a corresponding recess or hole 37 provided in the said transverse element 10f. With this arrangement it is essential that the transverse element 11f of the underframe be elevated above the element 10f of the underframe so that when underframes are linked end-to-end the feet of the legs 5f and 7f as well as those of the legs 4f and 6f of the linked underframes will all rest upon the ground.

A modification of the arrangement shown in FIGURES 30 to 33 is shown in FIGURES 34 and 35, and is particularly suitable for use with underframes made of laminated wood or the like. In this arrangement the pin 36 above described is replaced by a larger tongue or rib 38 extending along the underside of the transverse element 11g of the pair of legs 5g, 7g and is adapted to engage in a slot or groove 39 provided along the transverse element 10g of the pair of legs 4g, 6g. The said rib or tongue may conveniently be made of rigid plastic material, metal, fibre or wood.

It should be understood that the arrangements described with reference to FIGURES 27 to 35 may be reversed and the channel 33, pin 37, or rib 38 may be provided on the under-transverse element 10e, 10f or 10g for engagement in the superimposed transverse element 11e, 11f or 11g instead of vice versa. Moreover it will readily be appreciated that in these constructions the close engagement of the one end pair of legs within another pair when the underframes are interlinked will prevent movement of the underframes relatively to one another in a direction transverse to the length of the row of underframes.

In the embodiments of the invention illustrated in FIGURES 27 to 35, the telescoping of adjacent units in a row is prevented by the inter-engagement of the transverse elements of the legs of such units, which precludes longitudinal movement of the units in either a separating or a telescoping direction.

Whilst they show a chair very similar to that described with reference to FIGURES 8 and 9, FIGURES 36 and 37 illustrate a further modification in which the spacing of the front and rear legs of each end pair of legs of the underframe is the same instead of one pair being more widely spaced than the other, so that the end frames constituted by these end pairs of legs and their transverse elements are identical. In order to achieve satisfactory engagement of the interlocking end frames of the linked underframes one over the connecting members of the other and the proper engagement of the transverse element 10h of the one underframe behind the transverse element 11h of the adjoining end-to-end underframe, it is required in this case that the connecting members 8h and 9h should first diverge for a short distance from the end pair of legs associated with the transverse element 11h and then gradually converge towards one another to within a short distance of the other end pair of legs of the underframe when they should again diverge to the positions at which they are secured to the last mentioned legs. These initial and final divergences and the intermediate convergence of the connecting members 8h and 9h enables the successive underframes to be linked together in the same manner as the underframes above described with reference to FIGURES 1 to 5 whilst still permitting the underframes readily to nest vertically upon the other.

In all the embodiments of the invention described the interlocking together of linked underframes is achieved by means located within the external boundaries of the underframe so that there are no projections of any kind extending longitudinally or transversely outwardly beyond the end pairs of legs.

I claim:

1. A rigid underframe for a nesting unit linkable in longitudinal end-to-end relationship with an identical underframe of a like unit, said underframe comprising a first and second pair of mutually downwardly divergent legs, said pairs of legs being spaced apart longitudinally of said underframe, and each pair having a front and rear leg disposed therein, said first and second pairs of legs of said underframe when nested on one or more of said identical underframes straddle the said first and second pairs of legs of the next said identical underframe to form a front elevational stack of said underframes, said first and second pairs of legs of each of said stacked underframes being nested in the same upright plane, a first and second rigid transverse element, each said transverse element extending between the upper portion of the front and back leg of each said pair of legs to form a pair of first and second open bottomed, arched end frames, and a first and second connecting member, said first member connecting the rear leg of each said end frame and said second member connecting the front leg of each said end frame in longitudinally spaced relationship, said first transverse element of said underframe adapted to engage the said second transverse element of said identical underframe to prevent endwise separation of said underframes when said first end frame is interengaged with the said second end frame of said identical underframe, the said second end frame being located entirely within the upright end planes defined by the outermost surfaces of said first and second end frames when linked in end-to-end alignment.

2. A rigid underframe for a nesting unit linkable in longitudinal end-to-end relationship with an identical underframe of a like unit, said underframe comprising a first and second pair of mutually downwardly divergent legs, a front and rear leg disposed in each said pair, said second pair of legs being more widely spaced apart than said first pair, said underframe when nested upon other identical underframes forming a front elevational stack of straddling superposed underframes wherein said first and second pairs of legs of each stacked underframe fall into the same upright plane, a first and second transverse element each rigidly secured to the upper portion of said first and second pair of legs, respectively, to form a first and second open bottomed arched end frame of substantially equal height, and a first and second connecting member, said first member rigidly connecting the front legs of said first and second end frames, and said second member rigidly connecting the rear legs of said end frames and holding said end frames in spaced parallel relationship, said connecting members being disposed downwardly from said first transverse element for engagement of the second transverse element of the second end frame of such identical underframe over said connecting members and behind said first end pair of legs of said first end frame, whereby the second transverse element of such identical underframe abuts said first transverse element to link said interengaged underframes against endwise separation.

3. An underframe according to claim 2 wherein stop means are mounted on said connecting members adjacent said first pair of legs, said stop means engaging the said second transverse element of another identical underframe when placed in linking position therewith to prevent endwise telescoping in the direction of a row of such linked underframes.

4. An underframe according to claim 2 wherein the internal spacing of said second pair of legs is dimensioned to fit closely over the said connecting members of said identical underframe to prevent relative movement therebetween transversely of the direction of a row of such linked underframes.

5. A rigid underframe for a nesting unit linkable in longitudinal end-to-end relationship with an identical underframe of a like unit, said underframe comprising a first and second pair of mutually downwardly divergent legs, a front and rear leg disposed in each said pair, said second pair of legs being more widely spaced apart than said first pair, said underframe when nested upon other identical underframes forming a front elevational stack of straddling superposed underframes wherein said first and second pairs of legs of each stacked underframe fall into the same upright plane, a first and second transverse element rigidly secured to the upper portion of said first and second pair of legs, respectively, to form a first and second open bottomed arched end frame, a rigid tongue extending downwardly from said second transverse element and an upwardly directed groove disposed on said first transverse element to matingly receive the said tongue of said identical underframe, the said second pair of legs of said identical underframe straddling and falling into the same upright plane as the said first pair of legs of said underframe when linked thereto in end-to-end position.

6. An underframe according to claim 5 wherein said tongue extends the full length of said second transverse element and said groove extends the full length of said first transverse element.

7. A nesting chair, linkable in longitudinal end-to-end relationship with a like chair, comprising a seat panel, a first and second pair of upright mutually downwardly divergent legs, a front and a rear leg disposed in each said pair, said second pair of legs being more widely spaced apart than said first pair, said pairs of legs when said chair is nested straddling corresponding pairs of legs of the said identical chairs immediately below in the same upright plane to form a front elevational stack, a first and second transverse element, each rigidly secured to the upper portion of said first and second pair of legs respectively, to form a first and second pair of open bottomed inverted, substantially truncated V-shaped end frames, first and second connecting members, said first member rigidly connecting said front legs and said second member rigidly connecting said rear legs of said end frames in spaced parallel relationship, said connecting members being disposed downwardly on said legs from said transverse elements, and first and second cross bars detachably supporting said seat panel and secured to said connecting members with one bar proximate each end frame, said bars extending across said members parallel to said transverse elements, said second end frame being adapted to engage over the said connecting members and between the said first end frame and the said first cross bar of said like chair to interlock said chairs against longitudinal relative movement when in linked formation.

8. A chair according to claim 7 wherein the inner surfaces of said cross bars engage the transverse marginal edges of the said seat panel of said identical chair nested immediately below to prevent relative endwise sliding movement of said chairs.

9. A chair according to claim 8 wherein the internal spacing between the legs of said second pair is dimensioned to fit over the said connecting members of said identical chair to prevent relative movement transversely of the direction of a row of said chairs when linked end-to-end.

10. A rigid underframe for a nesting unit linkable in longitudinal end-to-end relationship with an identical underframe of a like unit, said underframe comprising a first and second pair of mutually downwardly divergent legs, said pairs having a front and rear leg each and being spaced apart longitudinally of said underframe, said first pair of legs being more widely spaced apart than said second pair, said underframe when nested upon other identical underframes forming a front elevational stack of straddling superposed underframes with said corresponding pairs of legs being in the same upright plane, a pair of first and second rigid transverse elements, said first element extending between the upper portions of said first pair of legs to form a first open bottomed arched end frame, said second element extending between the upper portions of said second pair of legs to form a second open bottomed arched end frame, a pair of longitudinally spaced bars forming said first transverse element, the lower edges of said bars defining a downwardly directed channel, said first end frame adapted to vertically engage the said second end frame to seat the said second transverse element of said like underframe in said channel when said underframes are in linked end-to-end alignment.

11. A rigid underframe for a nesting unit linkable in longitudinal end-to-end relationship with an identical underframe of a like unit, said underframe comprising a first and second pair of upright mutually downwardly divergent legs, a front and rear leg disposed in each said pair, said underframe when nested upon other identical underframes forming a front elevational stack of superposed underframes wherein said first and second pairs of legs of each stacked underframe falls into the same upright plane, a first and second transverse element rigidly secured to the upper portion of said first and second pair of legs, respectively, to form a first and second identical open bottomed arched end frame, and a first and second connecting member, said first member rigidly connecting the front leg of said first and second end frames and the second member rigidly connecting the rear leg of said first and second end frames in spaced parallel relationship, said connecting members having a short outward divergence from said first end frame, then gradually converging inwardly to a short divergence from said second end frame, the combined diverging and converging configurations of said connecting members serving to facilitate said first end frame passing over the said second end frame of said like underframe to link such underframes against endwise separation.

12. A rigid underframe for a nesting unit linkable in longitudinal end-to-end relationship with an identical underframe of a like unit, said underframe comprising a first and second pair of upright mutually downwardly divergent legs, a front and rear leg disposed in each said pair, said underframe when nested upon other identical underframes forming a front elevational stack of straddling superposed underframes with said first and second pairs of legs of each stacked underframe falling into the same upright plane, a first and second transverse element each rigidly secured to the upper portion of said first and second pairs of legs to form a first and second open bottomed arched end frame, and a first and second connecting member, said first member rigidly connecting the front leg of said first and second end frames and the second member rigidly connecting the rear leg of said first and second end frames in longitudinally spaced relationship, the external front to rear width of said connecting members adjacent said second pair of legs being less than the internal spacing between said connecting members adjacent said first pair of legs, said first pair of legs thereby adapted to engage over the said second pair of legs of said like underframe to enterengage the respective transverse elements of said pairs when said underframes are linked against endwise separation.

13. An underframe according to claim 12 wherein the internal spacing between said members at the point of connection with said first pair of legs approximates the external spacing between said members at the point of connection with said second pair of legs to prevent transverse relative movement between said underframes when in linked position.

14. A rigid underframe for a nesting unit linkable end-to-end with an identical underframe of a like unit, said underframe comprising two end pairs of mutually spaced, downwardly divergent front and rear legs, a pair of transverse elements, and a pair of longitudinally connecting members, said members being disposed on said legs downwardly from said elements, each of said elements being rigid with an extending between the upper part of a pair of said front and rear legs to form a pair of open-bottomed inverted, substantially truncated V-shaped end frames, one of said members extending between and being rigid with said front legs and the other of said members extending between and being rigid with said rear legs to hold said end frames in longitudinally spaced relationship, one end portion being asymmetrical about a transverse central plane through said underframe relative to the other end portion thereof to form a wider asymmetrical end portion and a narrower end portion, said wider end portion passing over the narrower end portion of an identical underframe when arranged end-to-end therewith, wherein at least part of the transverse element of said wider portion engages behind a cooperating part of the transverse element of said identical narrower portion to link said underframes against longitudinal separation.

15. A rigid underframe for a nesting unit linkable end-to-end with an identical underframe of a like unit, such underframe comprising two end pairs of mutually spaced, downwardly divergent front and rear legs, a pair of transverse elements having a portion thereof bent inwardly, each said element being rigid with and extending between a pair of said front and rear legs, and connecting members rigid with and interconnecting said end pairs of legs to hold them in longitudinally spaced relationship, said connecting members being disposed downwardly on said legs from said transverse elements and being convergent from one end pair of said legs to the other pair of said legs to form a wider end pair and a narrower end pair, wherein said wider end pair engages the narrower end pair of an identical underframe when arranged end-to-end and the non-bent part of the transverse element of said wider end pair engages behind the corresponding part of the transverse element of said narrower end pair of said identical underframe to link said underframes against longitudinal separation.

16. A rigid underframe for a nesting unit linkable end-to-end with an identical underframe of a like unit, said underframe comprising two end pairs of mutually spaced, downwardly divergent front and rear legs, one front leg and one rear leg disposed in each said pair, a first connecting member extending between the front leg in each of said pairs, a second connecting member extending between the rear leg in each of said pairs, said connecting members extending longitudinally of said underframe to hold said pairs of legs in longitudinally spaced relationship, a pair of transverse elements, one of said elements being rigid with and extending between the upper parts of the front leg and the rear leg of one of said pairs of legs to form one end of said underframe, and a cooperating transverse element being rigid with and extending between the upper parts of the front leg and the rear leg of the remaining pair of said legs to form the other end of said underframe, at least part of said first mentioned transverse element of said underframe engaging over a part of the cooperating element of an identical underframe when joined in end to end relationship to link said underframes against longitudinal separation.

17. A rigid underframe for a nesting unit linkable end-to-end with an identical underframe of a like unit, said underframe comprising two end pairs of mutually spaced, downwardly divergent front and rear legs; a pair of transverse elements, and connecting members disposed downwardly from said elements, said members extending between said pairs of legs longitudinally of said underframe to hold said pairs of legs in longitudinally spaced relationship, each of said elements being rigid with and extending between the upper parts of a pair of said front and rear legs to form a first end and a second end on said underframe, said first end engaging behind a second end of an identical underframe and at least part of said transverse element disposed on said first end engaging behind a cooperating part of the transverse element disposed on the second end of such identical underframe when two of said underframes are linked in end-to-end relationship against longitudinal separation.

18. A rigid underframe for a nesting unit linkable in longitudinal end-to-end relationship with an identical underframe of a like unit, said underframe comprising a first and second pair of mutually downwardly divergent front and rear legs, a pair of connecting members rigidly interconnecting said legs in spaced relationship, a first connecting member extending between said front legs and a second connecting member extending between said rear legs logitudinally of said underframe, each of said members being formed in one piece with its respective pair of legs, said underframe when nested on one or more of said identical underframes forming a front elevational stack in which said first and second pairs of legs of said underframe and the first and second pairs of legs of each said like nested underframe are in the same upright plane, linking means disposed on said first pair of legs, and a rigid part connected to said second pair of legs adapted for linking inter-engagement with the said linking means means of said identical underframe, the said first pair of legs of said identical underframe being positioned entirely within the respective vertical planes defined by the outermost surfaces of said first and second pairs of legs of said underframe when said underframes are interlocked in linked end-to-end alignment.

References Cited in the file of this patent

UNITED STATES PATENTS

| | | |
|---|---|---|
| 2,679,736 | Duchin | June 1, 1954 |
| 2,709,119 | Chapman et al. | May 24, 1955 |
| 2,833,607 | Mackintosh | May 6, 1958 |
| 2,857,223 | Furey | Oct. 21, 1958 |
| 2,890,087 | Stevens | June 9, 1959 |
| 2,893,469 | Eames et al. | July 7, 1959 |
| 2,952,300 | Cohen | Sept. 13, 1960 |

FOREIGN PATENTS

| | | |
|---|---|---|
| 322,933 | Switzerland | July 15, 1957 |
| 601,889 | Great Britain | May 13, 1948 |
| 640,867 | Great Britain | Aug. 2, 1950 |
| 718,326 | Great Britain | Nov. 10, 1954 |
| 744,608 | Great Britain | Feb. 8, 1956 |
| 1,163,887 | France | May 5, 1958 |